(12) United States Patent
Uceda-Sosa

(10) Patent No.: US 7,958,074 B2
(45) Date of Patent: Jun. 7, 2011

(54) METHOD AND STRUCTURE FOR DOMAIN-INDEPENDENT MODULAR REASONING AND RELATION REPRESENTATION FOR ENTITY-RELATION BASED INFORMATION STRUCTURES

(75) Inventor: Rosario Uceda-Sosa, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1214 days.

(21) Appl. No.: 10/326,400

(22) Filed: Dec. 23, 2002

(65) Prior Publication Data
US 2004/0122786 A1  Jun. 24, 2004

(51) Int. Cl.
*G06N 5/00* (2006.01)
(52) U.S. Cl. .......................................... 706/46; 706/45
(58) Field of Classification Search .................... 706/46, 706/45; 715/716; 700/83; 707/1; 435/6
See application file for complete search history.

(56) References Cited

U.S. PATENT DOCUMENTS

| 5,784,286 | A   |   | 7/1998  | Hirose et al.       |        |
|-----------|-----|---|---------|---------------------|--------|
| 5,970,490 | A   |   | 10/1999 | Morgenstern         |        |
| 6,374,252 | B1  |   | 4/2002  | Althoff et al.      |        |
| 6,400,996 | B1  | * | 6/2002  | Hoffberg et al.     | 700/83 |
| 6,505,209 | B1  |   | 1/2003  | Gould et al.        |        |
| 6,640,145 | B2  | * | 10/2003 | Hoffberg et al.     | 700/83 |
| 6,780,589 | B1  | * | 8/2004  | Gulati              | 435/6  |
| 6,850,252 | B1  | * | 2/2005  | Hoffberg            | 715/716|
| 6,988,093 | B2  | * | 1/2006  | Pic et al.          | 707/1  |
| 7,150,015 | B2  |   | 12/2006 | Pace et al.         |        |
| 2002/0129017 | A1 |  | 9/2002  | Kil et al.          |        |
| 2003/0014421 | A1 |  | 1/2003  | Jung                |        |

OTHER PUBLICATIONS

U.S. Office Action dated Mar. 4, 2009.

* cited by examiner

*Primary Examiner* — Wilbert L Starks, Jr.
(74) *Attorney, Agent, or Firm* — McGinn IP Law Group, PLLC

(57) ABSTRACT

A method (and structure) for using reasoning heuristics in a network-based information system based on an entity/relation paradigm and characterized as being a self-similar hypergraph. The method includes packaging domain-independent reasoning heuristics so that they can be attached to data in a self-similar-hypergraph information system, thereby allowing self-describing knowledge capsules to be created from the data.

16 Claims, 6 Drawing Sheets

METHOD AND STRUCTURE FOR DOMAIN-INDEPENDENT MODULAR REASONING AND RELATION REPRESENTATION FOR ENTITY-RELATION BASED INFORMATION STRUCTURES

CROSS-REFERENCE TO RELATED APPLICATIONS

The present Application is related to U.S. patent application Ser. No. 10/326,380, filed on Dec. 23, 2002, to Rosario Uceda-Sosa, entitled "METHOD AND STRUCTURE FOR UNSTRUCTURED DOMAIN-INDEPENDENT OBJECT-ORIENTED INFORMATION MIDDLEWARE", and to U.S. patent application Ser. No. 10/326,375, filed on Dec. 23, 2002, to Rosario Uceda-Sosa, entitled "METHOD AND STRUCTURE FOR TEMPLATE-BASED DATA RETRIEVAL FOR HYPERGRAPH ENTITY-RELATION INFORMATION STRUCTURE", both assigned to the present assignee, and both incorporated herein by reference.

BACKGROUND OF THE INVENTION

1. Field of the Invention

The present invention generally relates to a method of packaging reasoning heuristics so that they can be easily attached to data, thereby effectively creating individual and self-describing knowledge capsules which can be stored or transmitted through a network using standard and widely available software techniques. The technique is particularly advantageous in distributed knowledge architectures, such as multi-agent environments in which knowledge is communicated or transferred between independent parts of the architecture.

2. Description of the Related Art

Even though there has been much study on knowledge representation and reasoning based on the entity-relation paradigm (semantic networks, conceptual graphs, frames), the focus has been on how functionally powerful these systems are, such as what type of information can be stored, and what type of inferencing can be made.

Conventional systems implementing this paradigm have centralized architectures and reasoning heuristics which are available to the system permanently, thereby causing each system to be isolated from a system having different architecture and reasoning heuristics. Furthermore, reasoning is rule-based, as opposed to navigation-based reasoning.

With the advent of multiagent environments, the focus of knowledge systems has been centered on partial knowledge management, and system-wide heuristics (i.e., what assertions can be made of the system as a whole).

The conventional knowledge systems using this whole-system approach have not worked well in multiagent environments. Thus, hitherto the present invention, there has been no knowledge system providing the capability to construct inferences in a multiagent environment, using data and heuristics independent of any specific domain.

SUMMARY OF THE INVENTION

In view of the foregoing problems, drawbacks, and disadvantages of the conventional systems, a purpose of the present invention is to provide a structure (and method) for representing, storing, and using reasoning heuristics and their underlying binary relations in information systems based on the entity-relation paradigm. The present invention also provides a method that can be applied to any information structure based on the entity-relation model, regardless of the knowledge domain.

According to the present invention, a method is provided in which information about relations may be represented in a declarative fashion that allows performing meta-inferencing on the data.

This meta-inferencing technique is preferably independent of the specific relations of the data, so they can be dynamically added/removed from the space.

The present invention also presents a navigation-based reasoning technique, in contrast to the conventional rule-based reasoning techniques.

To accomplish the above purposes and goals, in a first aspect of the present invention, herein is described a method (and structure) for using a reasoning heuristic in a network-based information system based on an entity/relation paradigm and characterized as being a self-similar hypergraph, including packaging a domain-independent reasoning heuristic so that it is attachable to data in a self-similar-hypergraph information system, thereby allowing self-describing knowledge capsules to be created from the data.

In a second aspect of the present invention, herein is described a method (and apparatus) of navigating through an information system, including establishing a relational algebra defining a set of relations over the information system and retrieving information from the information system by using the relational algebra to provide an automatic inferencing over the information system.

In a third aspect of the present invention, herein is described a network configured to navigate through a network-based information system, including at least one computer having at least one of: a middleware module containing a relational algebra, said relational algebra defining a set of relations over a network-based information system and a middleware module permitting information to be retrieved from the network-based information system by using the relational algebra to provide an automatic inferencing over the network-based information system.

In a fourth aspect of the present invention, herein is described a middleware module for navigating through an information system, including a module that packages domain-independent reasoning heuristics so that they can be attached to data in a self-similar-hypergraph information system, thereby allowing self-describing knowledge capsules to be created from the data and a meta-inferencing to be performed on the data.

In a fifth aspect of the present invention, herein is described a signal-bearing medium tangibly embodying a program of machine-readable instructions executable by a digital processing apparatus to perform a method of navigating through an information system, including establishing a relational algebra defining a set of relations over the information system and retrieving information from the information system by using the relational algebra to provide an automatic inferencing over the information system.

Thus, the present invention does not address the aforementioned information system issues by using system-wide heuristics. Rather, given an already existing set of reasoning heuristics, the present invention shows how this knowledge can be packed to be stored or transmitted, using available software techniques, so that meta-inferencing can be performed on the data itself.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
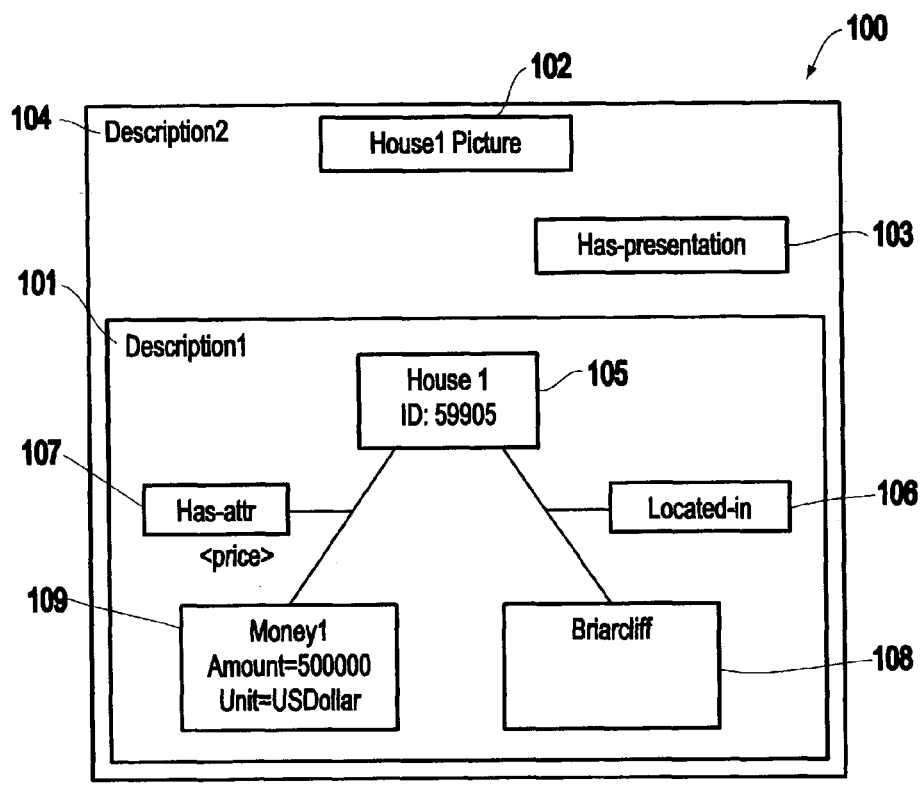
FIG. 1 shows exemplary node configuration 100 for use with a real estate database using the middleware program according to the present invention.

Referring now to the drawings, and more particularly to FIG. 1, a preferred embodiment of the present invention will now be described. A method according to the present invention is described for representing, storing, and using reasoning heuristics and their underlying binary relations in information systems based on the entity-relation paradigm. In the entity-relation paradigm, information is represented as entities with relations among them. Examples of information systems using the entity-relation paradigm are semantic networks, frames, or conceptual graphs. A binary relation is a relation that is defined between two nodes of the information system.

This invention packages reasoning heuristics so that they can be easily attached to data, effectively creating an individual and self-describing knowledge capsule, which can be stored or transmitted through a network using standard and widely available software techniques. This is particularly advantageous in distributed knowledge architectures, like multiagent environments, where knowledge is communicated or transferred between independent parts of the architecture.

The present invention has been exemplarily implemented as one of various novel aspects of a middleware program called IRIS (Information Representation Inferencing Sharing). By the incorporation of the present invention, IRIS attains the capability to represent, store, and use reasoning heuristics, thereby providing an inference capability that is domain-independent. It is noted, however, that this exemplary embodiment in the IRIS middleware is not intended as a limitation on the scope of the present invention.

The IRIS middleware module is further described in the two above-listed copending applications and in an article entitled "IRIS: An Intelligent Information Infrastructure For Distributed Knowledge Environments", published in the 2002 Proceedings of the International Conference on Intelligent Information Technology, pages 113-119, ISBN 7-115-75100-5/0267. The contents of this article are also incorporated herein by reference.

A heuristic is a rule that allows a procedure to be carried out. A heuristic, however, differs from an algorithm (i.e., a precise recipe to perform a task). In contrast, a heuristic is a rule or set of rules that facilitate a task but may not entirely solve or achieve that task. For example, an algorithm would be a complete recipe to bake a cake, including a precise listing of ingredients, mixing conditions, exact oven temperature and predetermined baking time. A possible heuristic for baking a cake would be a rule that the oven temperature should be no higher than X degrees and baking time should be no longer than Y minutes.

FIG. 1 shows a sample node configuration 100 as might be used for a real estate database using the middleware program IRIS described in greater detail in the above-listed copending applications. Every rectangle 101-109 shown in FIG. 1 is an IRIS node, including Description1 101 and Description2 104, which describe subgraphs.

Nodes in IRIS can contain a whole IRIS graph. This aspect, called "self-similarity", distinguishes the nodes of IRIS from nodes of other conventional systems. This aspect means that any IRIS graph (made up of nodes and nexus) can be described and addressed as a node.

Figure 2:
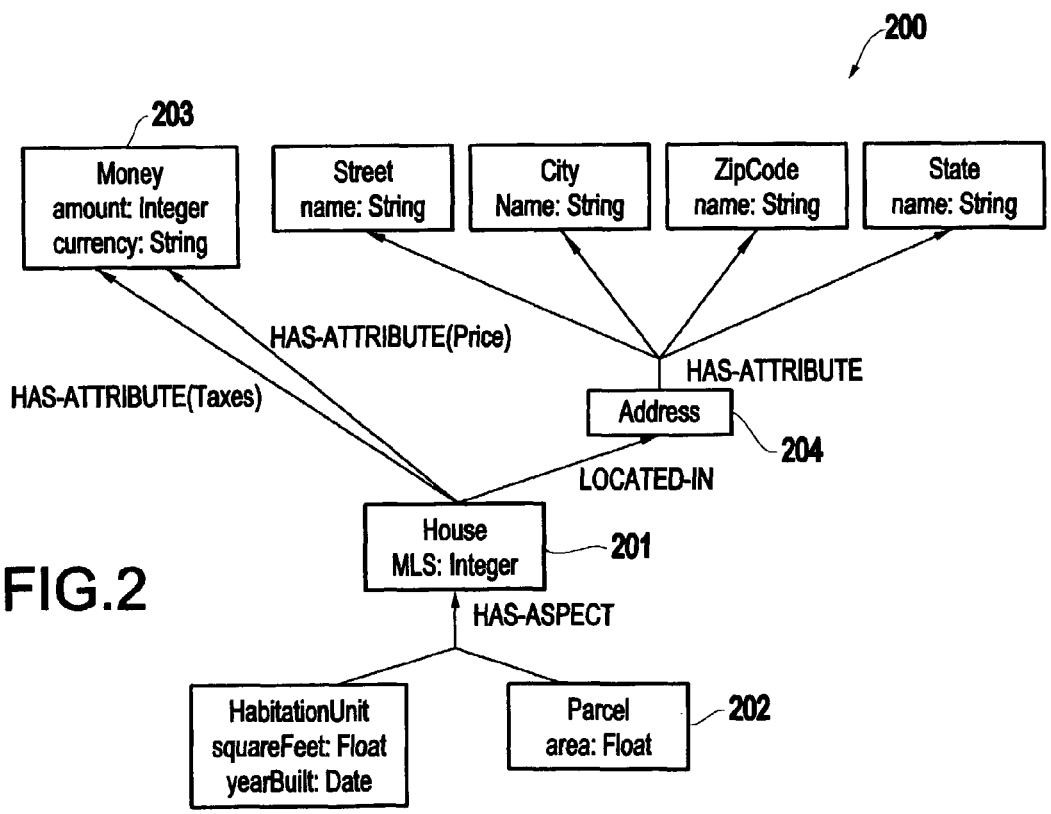
FIG. 2 shows a configuration 200 illustrating how information from a remote real estate database might be packaged to allow a query by a real estate agent.

FIG. 2 shows an exemplary ontology 200 that might be used in a repository of real estate data. Here, MLS stands for Multiple Listing Service, a unique identifier of a real estate property. A key advantage of IRIS is that it hides the complexity of data organization from agents, whether human agents such as real estate agents or software-implemented agents. For example, if an agent wants to find information on houses available in a specific city, without knowing the details of the underlying ontology 200, IRIS can return a collection of house objects with data from House 201, Parcel 202, Money 203, and Address 204. To do this, IRIS must know what the entity boundaries of House 201 are and what attributes or entities in its neighborhood must be selected.

Perhaps even more demonstrative to the present invention is a scenario in which a real estate agent wants to add new views (e.g., of the properties) which are to be integrated automatically with the data. IRIS must be able to reason about these new views as if they were native to the repository. For example, if an agent's main concern is the financial data on houses, he or she would be able to use IRIS to add a HouseProperty concept to capture the MLS, Price, and Taxes data by using the same interface of the query just mentioned above. The agent could then simply request instances of HouseProperty located in a specific city such as Scarsdale. To process the query, IRIS must be automatically able to relate HouseProperty to the City concept.

Before continuing with describing the technique of the present invention, it should be apparent that the information capsules in FIGS. 1 and 2 include two fundamental components: data and relations. By incorporating relations into information capsules, IRIS additionally is able to achieve an automatic inferencing capability. How this inferencing capability is accomplished by the present invention is described below.

The present invention has at least two main advantages. First, as previously mentioned, the present invention involves information capsules that package reasoning heuristics, such that the heuristics can be easily attached to data. Therefore, it effectively creates individual and self-describing knowledge capsules, which can be stored or transmitted through a network using standard and widely available software techniques. This is particularly advantageous in distributed knowledge architectures, such as multiagent environments, where knowledge is communicated or transferred between independent parts of the architecture.

By attaching reasoning heuristics to form self-describing knowledge capsules, inferencing can become domain-independent, so that inferencing can be executed on the knowledge capsules transferred to another part of the architecture, without the concern of conventional information systems in which there exists a centralized architecture and system-wide, permanently-attached reasoning heuristics.

Second, the present invention allows the dynamic updating (e.g., adding/deleting) of relations, so that knowledge can effectively evolve over time.

Two simple assumptions underlie the technique of the present invention. First, the underlying information system is assumed to be able to interface with an object-oriented software layer. Second, all relations in the information system are binary and are drawn from a finite, pre-specified set. This second assumption is a standard practice in most knowledge systems.

According to the present invention, binary relations are represented using their domain-independent properties, which facilitates domain-independent reasoning. This is achieved by storing the relations and their associated operations declaratively.

The method of the present invention can be applied to any information structure based on the entity-relation model, regardless of the knowledge domain. However, to illustrate the workings of this method, it is described in the context of the entity-relation based information structure IRIS. The above-listed copending applications illustrate the representation and workings of IRIS objects using Java-like pseudocode, and the same is done in this discussion of inferencing.

Figure 3:
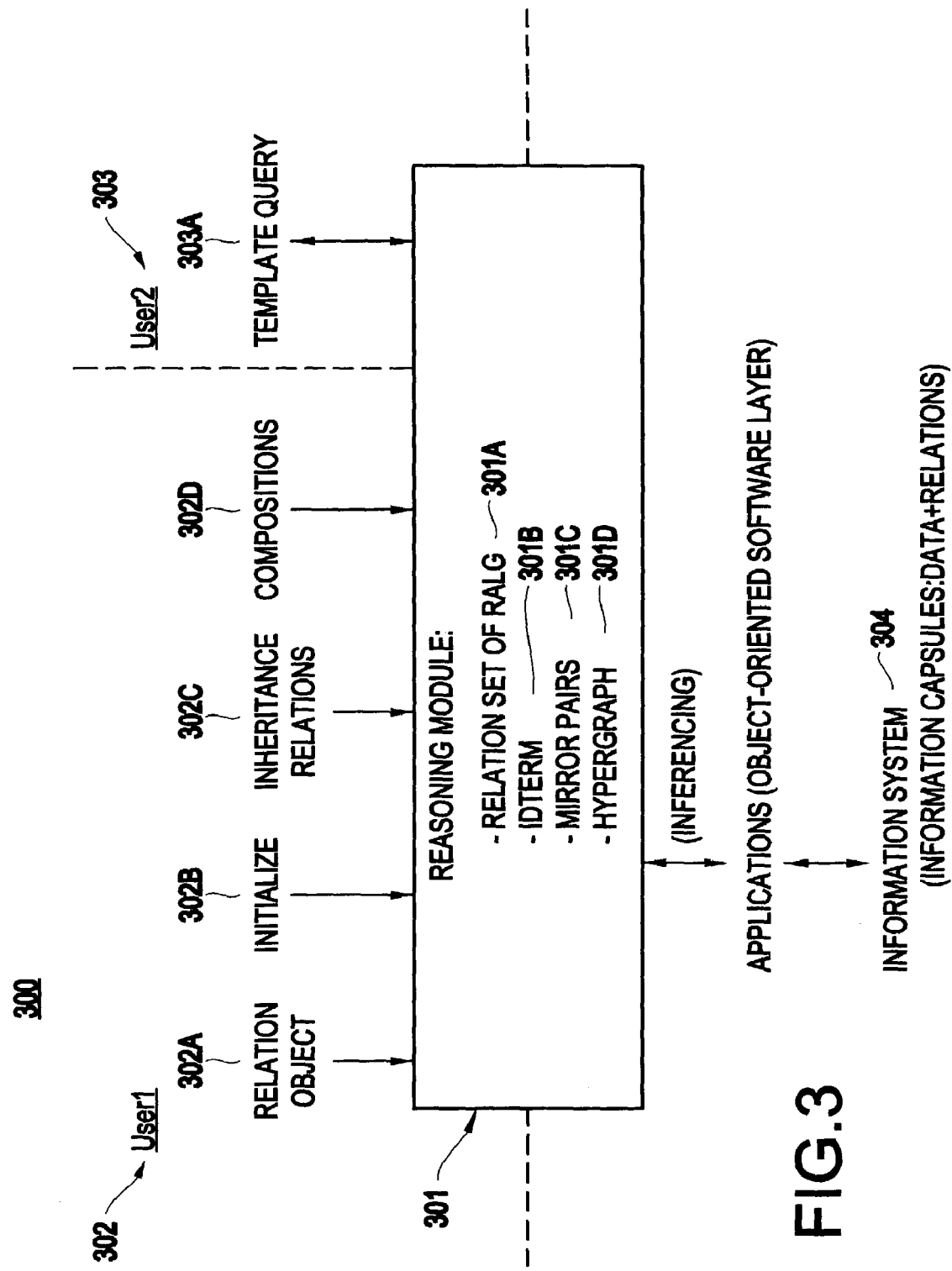
FIG. 3 provides an upper-level architecture 300 of the present invention.

FIG. 3 illustrates an overview of a preferred configuration 300 of the present invention. The heart of the present invention is the reasoning module 301, initially set up by user1 (302) by entering information 302A-302D, as described below. Once set up, the reasoning module 301 allows user2 (303) to use templates 303A to query the information capsules 304 that are constructed of data interconnected by relations. These information capsules 304 are described in the first above-listed copending application. The query interactions with the information capsules 304, using templates 303A, as used by user2 to query the information system, are described in the second above-listed copending application.

The present invention describes how the Reasoning Module 301 may be set up by defining a relational algebra and using APIs that set up the Reasoning Module. Basically, user1 will provide inputs 302A-302D to define the components 301A-301C of the Reasoning Module 301. Once this reasoning module has been initialized, user2 can use it to conduct automatic inferencing over the information capsules of the underlying information system.

The Representation of Relations

In the method of the present invention, binary relations are preferably represented as entities with structural properties and which are domain-independent. New relations in this system may be defined by providing the following information for a relation. This information can be entered manually by inputting (e.g., through a keyboard or other input device) the information in accordance with the formats discussed later. Alternatively, an Application Program Interface (API), including perhaps a GUI (Graphic User Interface) could be used. It should be noted that various parameters below can be assumed to have a default value.

A. Name: The name of the relation.

B. Semantic Dominance: Defined as follows. Given a binary relation R(a,b), R is said to have "semantic dominance" in the first term if every a is a conceptual, material or ontological context for b with respect to R. Similarly, R is said to have semantic dominance in the second term if every b is a conceptual, material or ontological context for a with respect to R.

For example, returning to relations that might be used in the real estate ontology shown in FIG. 2, the relation IS-A has semantic dominance in the second term and HAS-PART(a,b) has semantic dominance in the first term.

Also, relations may have no semantic dominance in any term. For example, IS-ASSOCIATED-TO is a relation having no semantic dominance in any term.

Henceforth, it is assumed that, if a relation has no semantic dominance, it is its own inverse, and that all relations that are not their own inverses have exactly one semantically dominant term. If a relation is not its own inverse and it is not obvious which term should be semantically dominant, one term is arbitrarily chosen by the system as semantically dominant.

It is worth noting that, if a binary relation R has semantic dominance in one term, say the first, its inverse, $R^{-1}$ has semantic dominance in the other, i.e., the second. If the semantic dominance of R is chosen arbitrarily, as indicated above, the semantic dominance of $R^{-1}$ is chosen so that it respects this rule.

C. Reflexivity. Whether the relation is reflexive. A binary relation R over a domain D is reflexive if, for all elements a in the domain, R(a,a) holds.

D. Symmetry. Whether the relation is symmetric. A binary relation R over a domain D is symmetric if, whenever R(a,b) holds, R(b,a) also holds.

E. Antisymmetry: Whether the relation is antisymmetric. A binary relation R over a domain D is antisymmetric if, whenever R(a,b) and R(b,a) holds, it is the case that a and b are the same element of D.

F. Transitivity. Whether the relation is transitive. A transitive relation R over a domain D is transitive if, whenever R(a,b) and R(b,c) holds, then R(a,c) also holds.

Relational Algebras

A Relational Algebra is defined as a finite set of binary relations over the set Dom, the domain of discourse, and closed under composition and inverse. More formally, a relational algebra $R_{ALG}$ is a tuple:

$$R_{ALG} = \{Dom, \{R_1, \ldots, R_n\}, o, ^{-1}, R_{Univ}, R_{Empty}, I_{DTERM}\}$$

where Dom is the domain of discourse. $R_1, \ldots, R_n$ are binary relations over the domain of discourse, and are collectively called the relational set. The operations o and $^{-1}$ are, respectively, "composition" and "inverse". $R_{UNIV}$ is the universal relation over Dom, and $R_{EMPTY}$ is the empty relation. The last member of the tuple, $I_{DTERM}$, is an integer, either 1 or 2. This integer is used in the computational representation of the Reason Module described below.

The definitions and properties of binary relations, composition of relations, inverse of relations, universal relation and empty relation are standard in mathematics and logic. However, the notion of a Relation Algebra, its functionality as a means to navigate through information networks, and its use in reasoning is one of the many novel contributions of the present invention, as are the notions of a mirror pair, Reasoning Algebra, Reasoning Module, etc., discussed below.

Given a relation R in the relation set, the pair $<R, R^{-1}>$, where R has the dominance in the term indicated by $I_{DTERM}$, is called a mirror pair. Note that if R does not have semantic dominance, then it is its own inverse, so that the mirror pair becomes <R, R>.

Example 1

As a first example of a Relational Algebra, the following is an exemplary Relational Algebra of relations over the domain of building blocks, a domain commonly used in computer applications in which robots exercise relations to maneuver around or among blocks or to manipulate blocks. The Relational Algebra BuildingBlocks is defined, as follows:

$$R_{Blocks} = \{BuildingBlocks, RSet, o, ^{-1}, R_{Univ}, R_{Empty}, 1\},$$

where RSet is made up of the following relations:
- A. NEAR-OF: Transitive. No semantic dominance. Inverse is NEAR-OF.
- B. ON-TOP-OF: Transitive. Semantic dominance in the first term. Inverse is BENEATH-OF.
- C. BENEATH-OF: Transitive. Semantic dominance in the second term. Inverse is ON-TOP-OF.
- D. CONTAINS: Transitive. Semantic dominance in the first term. Inverse is CONTAINED-IN.
- E. CONTAINED-IN: Transitive. Semantic dominance in the first term. Inverse is CONTAINS.
- F. ADJACENT-TO (at least one of the sides touch): No semantic dominance. Inverse is itself.

The compositions of these relations are indicated in Table 1, where a cell on row i and column j represents Ri o Rj.

Reasoning Algebras

Another terminology of the present invention is that of a Reasoning Algebra. Given a Relational Algebra $R_{ALG}$, a Reasoning Algebra over $R_{ALG}$ is a tuple:

$$RM(R_{ALG}) = \{R_{ALG}, \leq=, R_{ROOT}\}$$

where <= is a partial order over the relational set of $R_{ALG}$ with a largest element, defined as follows:

$$R_i \leq= R_j \text{ iff } R_i \text{ is a subset of } R_j$$

This order has exactly one largest element, $R_{ROOT}$, so that each relation R of the relation set of $R_{ALG}$ satisfies $R \leq= R_{ROOT}$. Intuitively, this order represents an inheritance hierarchy among relations, where smallest relations are refinements of the largest ones.

Example 2

Figure 4:
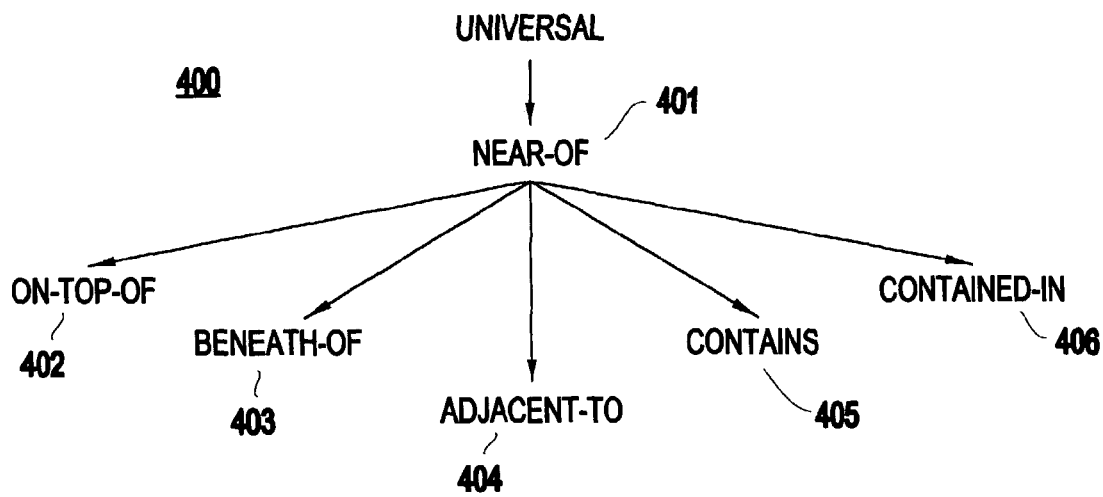
FIG. 4 shows an example 400 of the partial order of the Reasoning Algebra for Example 2, involving the BuildingBlocks domain.

Given the Relational Algebra of Example 1, the Reasoning Algebra is defined:

$$RM(R_{BLOCKS}) = \{R_{BLOCKS}, \leq=, UNIVERSAL\},$$

where the partial order <= is defined in FIG. 4. In that graph, there is a directed arrow between relations R1 and R2 iff R2<=R1. That is, it should be apparent that application of any of the lower relations 402-406 would be a subset of the NEAR-OF relation 401.

Reasoning Modules

Finally, also introduced is a Reasoning Module, as meaning the computational representation of a Reasoning Algebra. More formally, in a preferred embodiment of the invention a Reasoning Module over a Reasoning Algebra includes the elements (see FIG. 3):
- I. An underlying finite set 301A of binary relations: the relation set of $R_{ALG}$;
- I. An integer $I_{DTERM}$ 301B;
- II. A set of mirror pairs 301C from those relations; and
- III. A hypergraph 301D, with a root relation which is the universal relation in the relation algebra $R_{ALG}$.

Nodes of the hypergraph are relations from the relation set of $R_{ALG}$. Exactly all the first members of all possible mirror pairs of the relation set are nodes in a preferred Reasoning Module hypergraph.

Arcs of the hypergraph are of several types, including:
- i. Inheritance Arcs (binary): There is an arc between $R_i$ and $R_j$ iff $R_i \leq= R_j$. This means that $R_{ROOT}$ has only outgoing arcs.
- ii. Compositional Arcs (trinary): They are used to define certain (not all) definitions of compositions. For a clarification of which compositions are defined, see the discussion below on how the Reasoning Module is built (and, specifically, composition arc 602 shown in FIG. 6).

In the reasoning module, only the compositions that do not obey all the relations need to be represented, since composition relations satisfy the well known law:

$$(R_1 o R_2)^{-1} = R_2^{-1} o R_1^{-1}.$$

Once built, a Reasoning Module is used for inferencing in an entity-relation based information system, by determining the composition R of a sequence of relations $R_1 o \ldots o R_n$. This sequence of relations represents a path between two nodes.

Building a Reasoning Module

Now described are methods and an exemplary Application Program Interface (API) that may be used to build a reasoning module, using an Object-Oriented programming style pseudocode. The following functions (methods) are preferably used:

Method 1. RELATION Relation(STRING name, INTEGER semanticDominance, BOOLEAN reflexive, BOOLEAN symmetric, BOOLEAN transitive)—Self explanatory from the definition of a relation above. It is a constructor method for relations. The parameter semanticDominance can be 1, 2, or 0, meaning on the semantic dominance. The value itself is not necessary. The meaning of these values is that, given a relation R between A and B, the semantic dominance is either on the first element (A) the second element (B) or none. These situations are described by the values 1, 2 or 0 respectively.

Method 2. REASONINGMODULE ReasoningModule (STRING name, INTEGER iTerm, LIST mirrorPairs)—Initializes an empty Reasoning Module, initializing the empty and universal relations. The iTerm is the $I_{DTERM}$ in the definition of the Relational Algebra above, and the last parameter is a set of relation pairs indicating relations and their inverses (of type RELATION), as defined by the concept of mirror pairs above. The Reasoning Module Hypergraph is initialized by adding the universal relation as the root, and all the relations with semantic dominance in the iTerm, or without semantic dominance from the mirror pairs as children. The mirror pairs are checked so that only those relations with their own inverses have no semantic dominance. It is a constructor method for Reasoning Modules.

Method 3. BOOLEAN REASONING MODULE.addInheritance (RELATION parentRelation, RELATION childRelation)

This function defines the parameter parentRelation as the parent of childRelation, adding the corresponding arc to the relation hypergraph between parentRelation and childRelation. The algorithm is as follows:
- Step 1: Check that both relations are already defined in the REASONINGMODULE. If this is not the case, return FALSE.
- Step 2: Check that the hypergraph has not been customized. If it has been, return FALSE.

Step 3: Check that both relations have the semantic dominance in iTerm. If not, choose the other member of their mirror pairs.

Step 4: Check that there is no link between the child relation and any ancestor of the parent relation. If this is the case, cancel the operation and return FALSE.

Step 5: Remove any links between any ancestor of the parent relation and the child relation.

Step 6: Add a link between the parent relation and the child relation. Return TRUE.

Method 4. BOOLEAN REASONINGMODULE.setComposition (RELATION firstOperand, RELATION secondOperand, RELATION result)

This function sets the composition between two relations. The method preferably is performed as follows:

Step 1: Check that both relations are already defined in REASONINGMODULE. If this is not the case, return FALSE.

Step 2: Check that both relations have the semantic dominance in iTerm. If not, choose the other member of their mirror pairs.

Step 3: Mark the hypergraph as customized.

Step 4: A trinary arc is added to the Reasoning Module hypergraph iff the result of the composition is NOT the CompositionDefault R as defined below. Otherwise do nothing. Return TRUE.

Step 5: (CompositionDefault) The default composition R between Ri and Rj is their common transitive ancestor according to the relation inheritance hierarchy.

Figure 5:
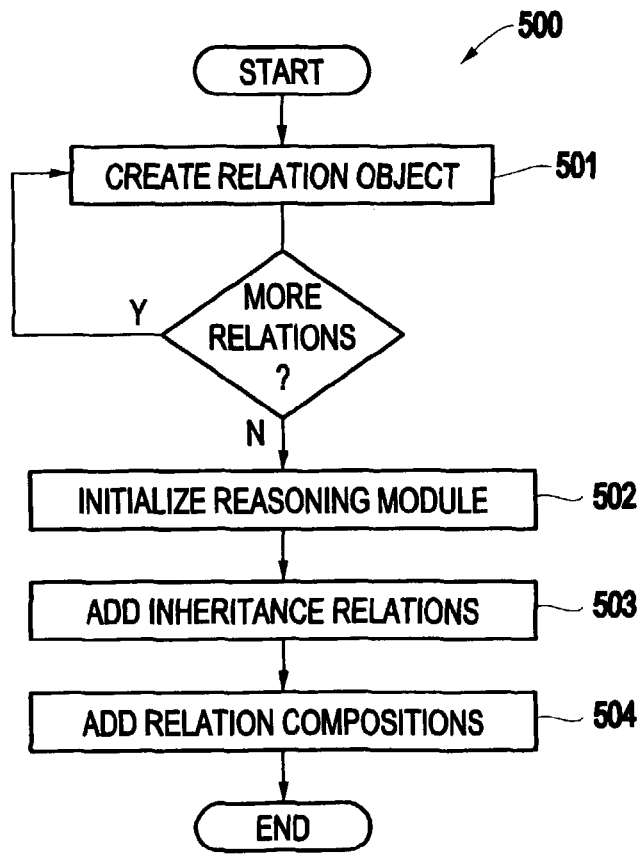
FIG. 5 is a flowchart of a method 500 to construct a Reasoning Module according to the present invention.

The user builds the Reasoning Module by interfacing with the methods described above in the following way (see FIG. 5):

Block 501. For every relation in the Reasoning Module, users create a RELATION object through the Relation( ) constructor above.

Block 502. Users initialize the Reasoning Module by calling the ReasoningModule( ) constructor above.

Block 503. Users add all the inheritance relations through the REASONINGMODULE.addInheritance( ) method above.

Block 504. Users add all the compositions between relations. The Reasoning Module applies the HAS-ATTRIBUTE relation as a default if the user does not specify a given composition between relations.

The user must perform these steps in order to preserve the consistency of the Reasoning Module. Note that the API functions (see Methods 1 through 4 above) already check for the consistency of the process.

Example 3

Figure 6:
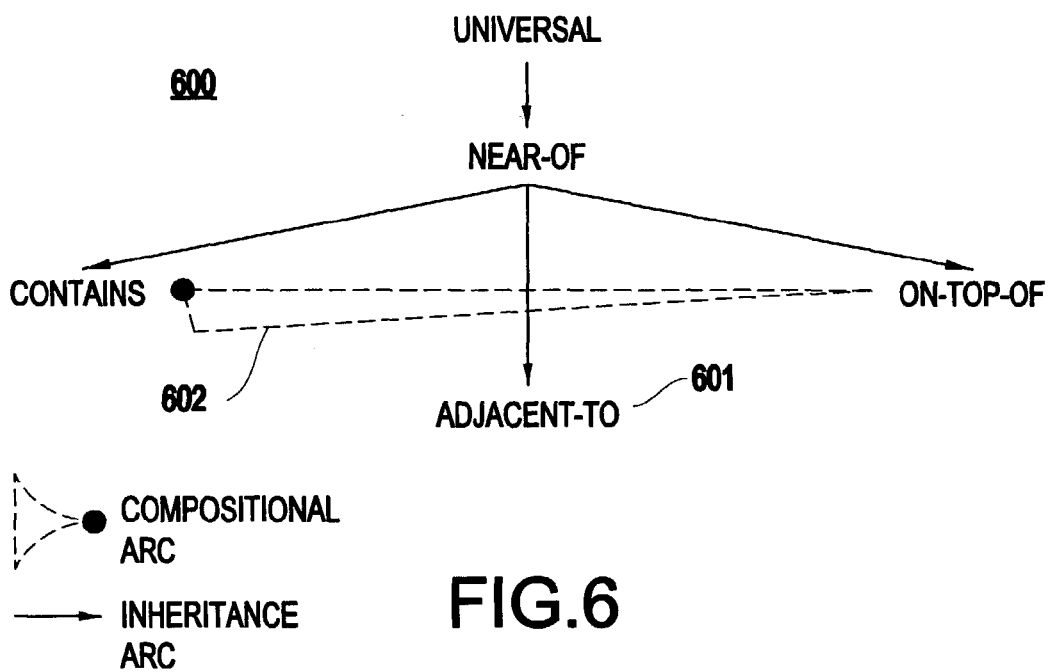
FIG. 6 shows a partial order 600, as discussed in Example 3.

Continuing examples 1 and 2, the Reasoning Module for the reasoning algebra $RM(R_{BLOCKS})$ is described by the hypergraph depicted in FIG. 4 and by indicating that all relations have semantic dominance in the first term. FIG. 6 shows the resultant partial order hypergraph 600 for this reasoning module. Note that the hypergraph representation may contain the same information as in Table 1, but in a much more concise format.

It is noted that the inverses of CONTAINS and ON-TOP-OF do not appear in FIG. 6, since they are understood. The inverse of IS-ADJACENT-TO 601 is itself. There is a non-standard composition 602, indicated by the dashed lines. This composition 602 means that ON-TOP-OF o CONTAINS=ON-TOP-OF. That is, if A is ON-TOP-OF B and B CONTAINS C, then A is ON-TOP-OF C.

Using Reasoning Modules

The Reasoning Module provides the methods below to applications wishing to do inferencing on relations:

A. RELATION compose(RELATION sourceR, RELATION targetR)—Returns the result of the composition sourceR o targetR. This is accomplished by searching the Reasoning Module Hypergraph. It is noted that all compositions have a solution, since all relations are refinements of the universal relation.

B. BOOLEAN isThereACompositionPath(RELATION sourceR, RELATION targetR)—This method determines whether there are relations $R_1, \ldots, R_n$, such that sourceR o $R_1 \ldots$ o $R_n$=targetR. Since the relation set is finite, this can be determined in a finite number of steps by searching the Reasoning Module Hypergraph.

Example 4

An information system wishing to do inferencing according to the technique of the present invention can easily answer the question:

"Given node A and relation R, what are the nodes N satisfying A-R->N?"

This question is actually not simple, since R may be the result of a composition $R_1$ o $\ldots$ o $R_n$ and, in reality, A-$R_1$-> $A_1 \ldots$ -$R_n$->N. (The symbology "A-R->N" means "all nodes N related by R to A".)

In this case, a trivial algorithm can be used that keeps searching for all neighbors N that are connected to A through R or through any relation R' that satisfies "is ThereACompositionPath(R', R)" until this condition is not satisfied, or R is finally found.

This final example shows how an information network (i.e., an IRIS space) is queried by users and how the relation algebras described herein help solve these queries. As this example demonstrates, the technique of the present invention provides a navigation-based reasoning, in contrast to the rule-based reasoning of conventional systems.

IRIS Architecture

IRIS was developed as the information infrastructure of an intelligent user interface, RIA (Responsive Information Architect) that interprets the end user's request for information and crafts a multimedia presentation (graphics and speech) on the fly. Each of the modules of RIA (graphics designer, speech designer, conversation manager) works as an agent that requires domain and presentation information from different perspectives. IRIS offers a unified information repository that at the same time is dynamically tailored to the modules' needs.

Figure 7:
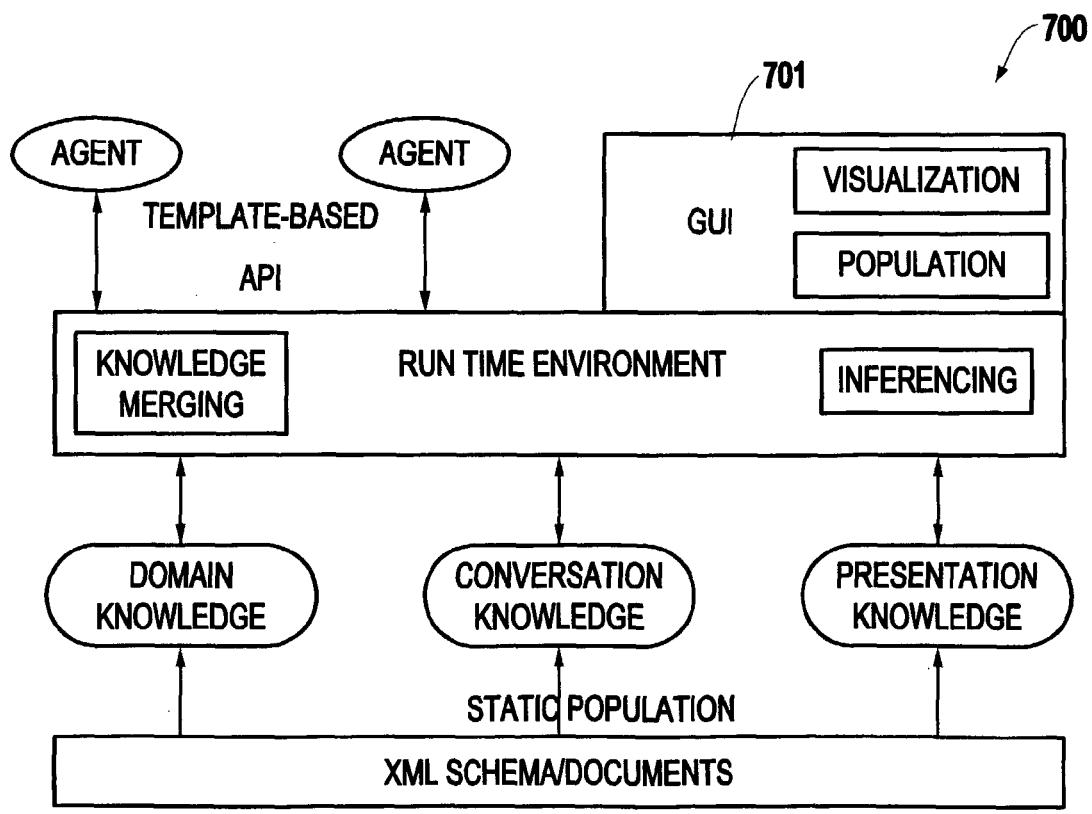
FIG. 7 is an exemplary IRIS architecture 700 according to the present invention.

The features of IRIS have been selected to satisfy the needs of several, possibly independent, agents accessing distributed information sources. In the realm of the RIA, IRIS represents domain, media and upper ontologies and data, as well as the conversational structure of the interface, in sizable spaces (50,000 nodes, 75,000 nexus). The architecture 700 of the prototype is depicted in FIG. 7.

Figure 8:
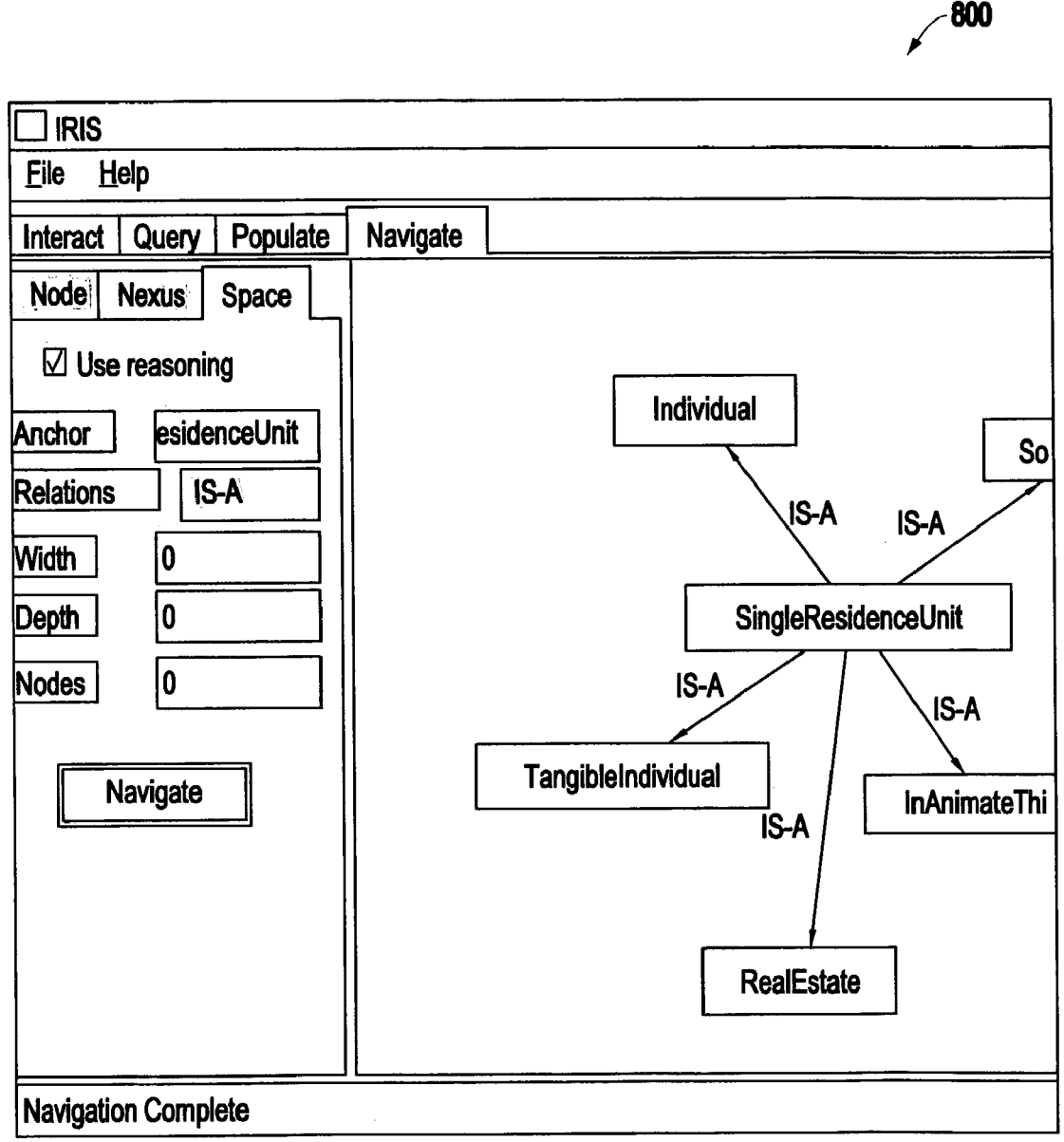
FIG. 8 illustrates an exemplary IRIS GUI 800 according to the present invention.

A GUI 701 is also provided for populating and visualizing of spaces, as well as for issuing simple template-based queries. FIG. 8 is an exemplary fragment 800 of a screen capture of a working interface with the prototype real estate and upper ontology described above by way of example with reference to FIG. 2. The GUI 701 provides population and visualization tools, as well as a simple template-based query facility.

In FIG. 8, the Space subpane may be used to issue simple template-based queries. In the example, the anchor is SingleResidenceUnit, and the Use reasoning tag indicates that the relations shown are obtained through inferencing, regardless of what the underlying relations on the IRIS space are.

The Width, Depth and Nodes restrict the shape of the result. In particular, Nodes indicates the maximum number of descendants of the anchor to be obtained. The entire pane may define a simple template.

A prototype of IRIS has been exemplarily implemented as a library of information services in Java®, and is fully operational. IRIS was designed to serve as an information infrastructure to a multimedia intelligent interface, where the modules of the architecture work as independent agents that access several repositories and require specific data content and organization. Since the present invention defines the range of information services, these agents are enabled to access integrated, yet customized information.

Even though the IRIS middleware has been described herein using Java-like conventions, it is generic enough to be implemented in any Object-Oriented environment. This infrastructure does not depend on any specific data semantics or data organization and it can flexibly represent not only declarative data like concepts and instances, but also relations, contexts, and even constraints and methods. Hence, it can be applied to virtually any knowledge domain and any information paradigm, from relational databases to semantic networks.

Other examples where IRIS middleware has been applied to date include automated auto diagnosis, authoring of business rules for e-commerce, and autonomic computing.

It should also be obvious to one of ordinary skill in the art that the technique of the present invention could be implemented on a network in a variety of configurations. For example, a user at a computer having an API module could be remote from a computer which has IRIS space data stored in memory allows the remote user to query the pre-existing IRIS space data. As another example, a computer at one location could be used to prepare and/or store the IRIS space data, which prepared space data is then sent to another computer for storage and/or usage. The network could also be used to allow the transfer of the middeware module to download for remote users.

Exemplary Hardware Implementation

Figure 9:
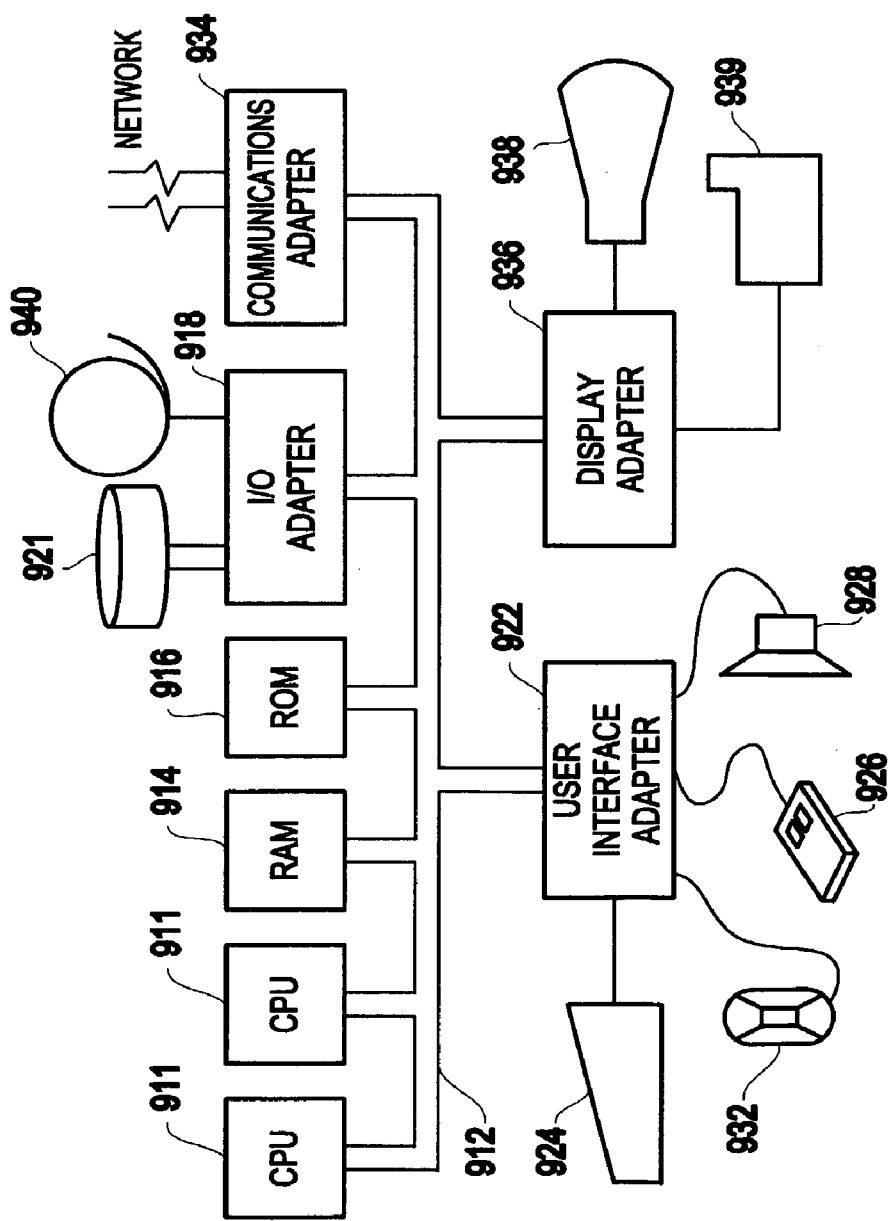
FIG. 9 illustrates an exemplary hardware/information handling system 900 for incorporating the present invention therein.

FIG. 9 illustrates a typical hardware configuration of an information handling/computer system in accordance with the invention and which preferably has at least one processor or central processing unit (CPU) 911.

The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communication adapter 934 for connecting an information handling system to a data processing network, the Internet, an Intranet, a personal area network (PAN), etc., and a display adapter 936 for connecting the bus 912 to a display device 938 and/or printer 939 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 911 and hardware above, to perform the method of the invention.

Figure 10:
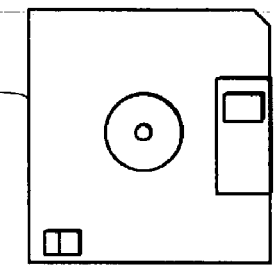
FIG. 10 illustrates a signal bearing medium 1000 (e.g., storage medium) for storing steps of a program of a method according to the present invention.

This signal-bearing media may include, for example, a RAM contained within the CPU 911, as represented by the fast-access storage for example. Alternatively, the instructions may be contained in another signal-bearing media, such as a magnetic data storage diskette 1000 (FIG. 10), directly or indirectly accessible by the CPU 911.

Whether contained in the diskette 1000, the computer/CPU 911, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of a single preferred embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described my invention, what I claim as new and desire to secure by Letters Patent is as follows:

1. A computerized method for at least one of creating, applying, and using a reasoning heuristic in at least one database of an information system accessible by a computer, said reasoning heuristic being based on an entity/relation paradigm, said method comprising:

provide a mechanism, as executed by a processor on a computer, for a user to at least one of define and interact with a domain-independent reasoning heuristic attachable to data in a database in said information system, thereby allowing self-describing knowledge capsules to be at least one of created from said data and, if data in said database is already encapsulated in said self-describing knowledge capsules, searched and retrieved from said database, wherein said data in said information system being so encapsulated in said self-describing knowledge capsules is thereby characterized as having a self-similar hypergraph ("fractal") format, said self-similar hypergraph format representing a graph in said information structure which comprises one or more nodes and each said node selectively comprises an entire subgraph, wherein a plurality of such heuristics are formed to provide a plurality of inferencing and meta-inferencing reasoning heuristics, and wherein relations information in said information system comprise binary relations and said inferencing and meta-inferencing reasoning heuristics are represented using domain-independent properties.

2. The method of claim 1, said method further comprising:

storing said relations and their associated operations in a declarative fashion, thereby allowing a performing of meta-inferencing on said data, as executed by a processor on a computer.

3. The method of claim 2, further comprising:

defining a relational algebra as a finite set of binary relations over a set domain of discourse (Dom).

4. The method of claim 3, wherein said relational algebra comprises: a tuple $R_{ALG}$, where tuple $R_{ALG}=\{Dom, \{R_1, \ldots, R_n\}, o, ^{-1}, R_{Univ}, R_{Empty}, I_{DTERM}\}$, Dom comprises a domain of discourse, $R_1, \ldots, R_n$ comprise binary relations over the domain of discourse, the operations o and $^{-1}$ comprise respectively composition and inverse, $R_{UNIV}$ comprises the universal relation over Dom, and $R_{EMPTY}$ comprises the empty relation, and the last member of the tuple, $I_{DTERM}$, comprises an integer.

5. The method of claim 3, further comprising:
defining a Reasoning Algebra over said Relational Algebra $R_{ALG}$, said Reasoning Algebra comprising a tuple:

$$RM(R_{ALG})=\{R_{ALG}, <=, R_{ROOT}\}$$

where $<=$ is a partial order over the relational set of $R_{ALG}$ with a largest element, defined as follows:

$$R_i <= R_j \text{ iff } R_i \text{ is a subset of } R_j.$$

6. The method of claim 1, further comprising providing a Reasoning Module, as executed by a processor on a computer, as a computational representation of said Reasoning Algebra, for inferencing in an entity-relation based information system, by determining a composition R of a sequence of relations $R_1 o \ldots o R_n$.

7. The method of claim 1, wherein said database comprises one of:
a database residing in an independent part of a network architecture accessible by said computer and wherein data in said independent part has been stored in a format other than said self-similar hypergraph format;
a repository of real estate data; and
an automatic automotive diagnosis database.

8. A computerized method of navigating through an information system comprising at least one database accessible by a computer, said method comprising at least one of:
establishing a relational algebra for data in said at least one database to be thereby expressible as self-describing knowledge capsules, said relational algebra defining a set of relations over said data in said at least one database in said information system;
retrieving information from said information system by using said relational algebra to provide automatic inferencing and meta-inferencing over said data in said at least one database in said information system, as executed by a processor on a computer; and
establishing an instantiation of a reasoning module on a computer to perform said automatic inferencing and meta-inferencing, as executed by a processor on a computer.

9. The method of claim 8, wherein said relational algebra allows said information system to comprise an information system based on an entity/relation paradigm and characterized as having a self-similar hypergraph ("fractal") format, said self-similar hypergraph format representing a graph in said information structure which comprises one or more nodes and each said node selectively comprises an entire subgraph.

10. The method of claim 9, wherein said information system comprises a network-based information system.

11. An apparatus for navigating through an information system, said apparatus comprising:
a middleware module comprising a signal-bearing medium tangibly embodying a program of machine-readable instructions executable by a digital processing apparatus, said middleware module allowing a user to at least one of:
define and interact with a relational algebra that defines a set of inferencing and meta-inferencing relations over data in a database of said information system; and
retrieve information from said information system by using said relational algebra to provide automatic inferencing and meta-inferencing over said information system,
said middleware module further comprising a reasoning module to perform said automatic inferencing and meta-inferencing, as executed by a processor on a computer.

12. The apparatus of claim 11, wherein said relational algebra allows said information system to comprise an information system based on an entity/relation paradigm and characterized as being a self-similar hypergraph, said self-similar hypergraph format representing a graph in said information structure that comprises one or more nodes and each said node selectively comprises an entire subgraph.

13. The apparatus of claim 11, wherein said information system comprises a network-based information system.

14. A network apparatus configured for navigating through a network-based information system, said network apparatus comprising at least one computer having at least one of the following:
a middleware module, as executed by a processor on a computer, allowing a user to at least one of define and interact with a relational algebra that defines a set of relations over data in at least one database in said network-based information system; and
a middleware module, as executed by a processor on a computer, permitting information to be retrieved from said network-based information system by using said relational algebra to provide automatic inferencing and meta-inferencing over said data in at least one database in said network-based information system,
said middleware module further comprising instructions that define a relational algebra comprising a finite set of binary relations over at least a subset of said information system and instructions for instantiating a reasoning module to perform said automatic inferencing and meta-inferencing, as executed by a processor on a computer.

15. A middleware module, as executed by a processor on a computer, for navigating through an information system, said middleware module comprising:
a module, as executed by said processor, that permits a user to package domain-independent reasoning heuristics so that they can be attached to data in a self-similar-hypergraph information system, thereby allowing self-describing knowledge capsules to be created from said data to perform inferencing and meta-inferencing on said data,
said middleware module further comprising instructions that define a relational algebra comprising a finite set of binary relations over at least a subset of said information system and instructions for instantiating a reasoning module to perform said automatic inferencing and meta-inferencing, as executed by said processor, based on inputs and instructions from said user.

16. A signal-bearing storage medium tangibly embodying a program of machine-readable instructions executable by a digital processing apparatus to perform a method of navigating through an information system, said method comprising:
establishing a relational algebra for data in at least one database in said information system, said relational algebra defining a set of relations over said data in said at least one database in said information system;

retrieving information from said information system by using said relational algebra to provide automatic inferencing and meta-inferencing over said data in said at least one database in said information system; and instantiating a reasoning module to perform said automatic inferencing and meta-inferencing.

* * * * *